United States Patent

[11] 3,586,911

| [72] | Inventor | Arthur A. Kraus<br>Joliet, Ill. |
|---|---|---|
| [21] | Appl. No. | 741,380 |
| [22] | Filed | July 1, 1968 |
| [45] | Patented | June 22, 1971 |
| [73] | Assignee | Electronic Safety Controls, Inc.<br>Joliet, Ill. |

[54] ELECTRICAL DISTRIBUTION SYSTEM
9 Claims, 1 Drawing Fig.

[52] U.S. Cl. .................................................. 317/18,
317/22
[51] Int. Cl. ...................................................... H02h 3/16
[50] Field of Search ........................................... 317/18, 18
A, 18 D, 22

[56] References Cited
UNITED STATES PATENTS

| 3,253,188 | 5/1966 | Nissel ........................... | 317/18 X |
| 3,344,313 | 9/1967 | Kraus ........................... | 317/18 |
| 3,407,337 | 10/1968 | Benham ........................... | 317/18 |
| 3,441,801 | 4/1969 | Kraus ........................... | 317/18 |

Primary Examiner—James D. Trammell
Attorney—Pendelton, Neuman, Seibold and Anderson ABSTRACT: An electrical distribution system is described wherein a grounded source supplies power to an ungrounded load through an isolation transformer with an ungrounded secondary. To prevent unnecessary loading by the isolation transformer primary during no-load conditions, the electrical source is connected to the isolation transformer primary only in the presence of a load. The circuit includes a ground sensing network which operates to disable the power source in the event the secondary circuit becomes grounded thereby creating a potentially hazardous condition. To prevent temporary ground conditions from permanently disabling the system, the circuit acts to automatically reset for a predetermined number of cycles after a ground condition is sensed. If the ground condition remains after the plurality of recyclings, then the system must be reset by hand after the grounded condition is remedied.

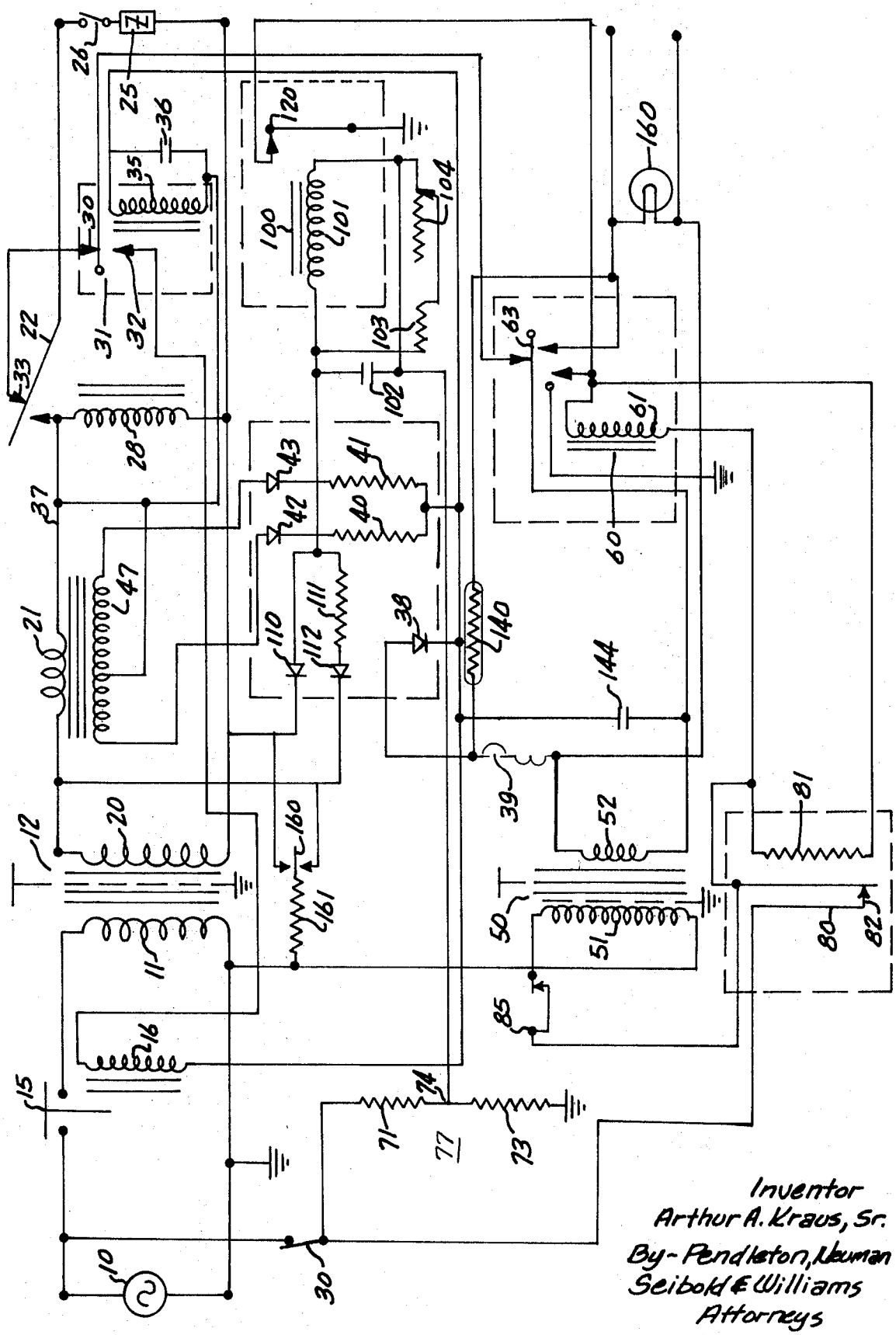

ELECTRICAL DISTRIBUTION SYSTEM

BACKGROUND OF THE INVENTION

1. Field of the Invention

This invention relates to electrical distribution systems and especially to an ungrounded electrical distribution system.

2. Brief Description of the Prior Art

The conventional approach to power distribution is a grounded source supplying power to a grounded load. While distribution of electrical energy from a power station to the end user may be facilitated by the use of grounded equipment, it is considerably safer to use an ungrounded source of supply in the home or building in which electrical power is used. Thus, in the case of a grounded distribution system, there is an extreme shock hazard where appliances which should be grounded are not grounded. In such a situation, if a human who is grounded, for example by standing on a wet floor, comes in contact with the faulty ungrounded appliance, he may experience serious shock. In the case of an ungrounded supply system, however, the danger simply does not exist.

In my U.S. Pat. No. 3,344,313, I describe a system for converting the conventional grounded power supply, which is supplied by all utility companies, to an ungrounded supply for use in the home or other location. The system includes an isolation transformer which connects to the main power supply only in the presence of a load to thereby prevent unnecessary loading by the primary of the isolation transformer. I also describe in that patent a ground detection system wherein a ground condition in the ungrounded secondary is sensed and the system is disabled to prevent a dangerous condition.

Brief Description of the Present Invention

The present invention is an improvement of the system described in my U.S. Pat. No. 3,344,313 and also in my pending patent application Ser. No. 705,563, now U.S. Pat. No. 3,441,801. The circuitry described in the present application is intended for more flexible usage in meeting various demands of home owners and factory installations. Moreover, the ground sensing circuit of the present invention operates to recycle a number of times in order to prevent a temporary ground condition from inconveniently disabling the entire power supply system. The ground sensing circuit is designed to disable the system if the ground condition exists for a predetermined number of cycles, with the result that the ground condition must be remedied before the system is again rendered operable.

DETAILED DESCRIPTION OF PREFERRED EMBODIMENT

The single FIGURE of the drawing illustrates the preferred embodiment of the subject invention. A source 10 is intended to indicate any source of grounded electrical energy; for example, a conventional electrical power transformer supplying power to a home, factory, or to specific electrical equipment such as the outlets used in conjunction with swimming pools etc. While a two-terminal supply 10 is indicated, in general, the invention may be employed with any source of power.

The source 10 is connected to the primary 11 of an isolation transformer 12 through a two-terminal, relay operated switch 15. The secondary 20 of transformer 12 is ungrounded and is the source of power for the system. For typical home use, the transformer 12 may be a 3 kv.-a., 120 volt to 120 volt isolation transformer. The details in a specific application depend upon both the source of energization and the extent of the load.

The switch 15 is operated by a load-responsive circuit which will be described below. In the absence of a load, the switch 15 is open so that the primary winding 11 does not unnecessarily load the source 10. The relay coil 16 which operates the two-terminal switch 15 is connected so that the switch 15 is open when the relay is not energized. The relay 16 may, for example, be a mercury relay with a 24 volt DC coil.

The source 10 is also connected through a main power switch 30, which is normally closed, to a voltage divider 70 comprising two resistors 71, 73, with its center tap 74 connected to one side of a relay coil 35 described below. The power supply switch 30 is also connected to the primary 51 of a transformer 50 through a delay relay 80 and a circuit breaker 85. The delay relay 80 is normally closed; it will open at some fixed time after it is energized, typically 5 seconds.

The secondary 20 of the main transformer 12 is connected through a current sensing transformer 21 and a two-terminal, relay operated switch 22 to a load impedance 25. The load impedance 25 is intended to represent any load which may be placed upon the transformer 12. For example, the load 25 might include the electrical appliances etc. in a house. A switch 26 is shown in series with the load 25 to illustrate the existence of a no-load condition.

The current sensing transformer 21 may, for example, be any low-resistance transformer which will generate a sufficient secondary output to operate the various relays as described below. By way of example, a typical transformer for a 50 amp maximum load current might be a saturable core transformer, having a 20 turn primary of No. 6 gauge wire and a 600 turn secondary of No. 32 gauge wire.

The relay coil 28 which controls the switch 22 is connected across the secondary 20. It is therefore a 115 volt coil. The coil 28 operates to maintain the switch 22 in the position shown when no energizing current is supplied to the relay, and to maintain the switch 22 in the alternate position in the presence of current.

The upper terminal 23 of the switch 22 is directly connected to a terminal 30 of another relay operated switch 31. The other terminal 32 of the switch 31 is connected to the relay coil 16 which operates the switch 15 in the primary circuit. The relay coil 35, which operates the switch 31, is shunted by a capacitor 36. The lower end of the coil 35 is connected to one of the power supply lines 37. The other end of the coil 35 is connected through a diode 38, a circuit breaker 39, a secondary 52 of a transformer 50, the closed contact 63 of a relay 60, back to the upper contact 30 of the relay 31. The same side of the coil 35 is connected through two resistors 40, 41 and two diodes 42, 43 to opposite sides of the secondary 47 of the current sensing transformer. The center tap of the current sensing transformer is connected to the line 37.

The operation of the circuit thus far described will be explained before describing the remainder of the circuit. The described circuit operates to cause power from the source 10 to be delivered to the transformer 12 in the presence of a load, i.e., when the switch 26 is closed. In a no-load condition when the switch 26 is open, the three switches 15, 22 and 31 are in their indicated positions. As soon as a load is applied, for example, by closing the switch 26, current immediately flows through the switch 26 and the load 25 from the secondary 52 of the transformer 50. The path for this current flow is as follows: Assuming a current flow from the lower to the upper end of the secondary 52, current flows through the circuit breaker 39, through the diode 38, through the relay coil 35 (after charging the capacitor 36), through the current sensing transformer primary 21, through the main secondary 20, through the load 25 and switch 26, through the contacts 33, 30 and 63, and back to the lower end of the secondary 52. The amount of current flowing in this path is, of course, determined by the magnitude of the load 25. If the magnitude of the current is above a predetermined minimum, then the relay coil 35 will be energized to change the state of the switch 31. The minimum may be put at any convenient value. Current is supplied from the secondary 52 to the first relay 16, to close the power supply switch 15 in the primary circuit of the transformer 12. The path for this current flow is from the secondary 52, through the circuit breaker 39, through the diode 38, through the relay coil 16, through the contacts 32 and 63, and back to the secondary 52.

When the switch 15 is closed, the primary 11 is energized and current flows in the secondary 20 to energize the relay coil 28. As soon as the relay coil 28 is energized, the switch 22 changes state and current from the secondary 20 is supplied to the load 25. The current sensing transformer 21 senses the current being supplied to the load and generates a secondary current, which is full wave rectified by the diodes 42 and 43, to maintain the coil 35 in an energized condition and thereby maintain the coil 16 in an energized condition to keep the switch 15 closed. Should the load 25 drop to below the predetermined level, the relay coil 35 will drop out, thereby deenergizing the coil 16 and opening the primary circuit.

One of the safety features of the present invention lies in this "turn on" feature of the invention. For normal household use, for example, the relay 35 can be chosen with a sensitivity causing energization at a load of approximately 2 watts. Thus, if a human being were to accidentally place himself across the power supply, the load would not be sufficient to turn on the circuit.

The circuit described up to this point may be used alone, without the remainder of the illustrated circuitry to provide a load-responsive ungrounded supply system. The circuit parameters may be easily varied to correspond to various needs. In particular, the relay 35 is preferably a plug-in type relay which allows a change in the sensitivity of the circuit by merely plugging in relays of different sensitivities.

Where the load-responsive circuitry thus far described is used alone, without the remainder of the illustrated circuitry, it is not necessary to employ the relay actuated switches 63 and 80. The switches can be replaced by simple electrical connections.

The remainder of the illustrated circuitry operates as a ground sensing and interrupter circuit. While this circuit is particularly useful with the load-responsive circuit already described, it too can be used alone. For example, the ground sensing circuit is particularly useful in connection with electrical tools and power equipment.

A ground sensing relay 100 has a coil 101 which is connected in parallel with a capacitor 102 and a variable resistor network including a first fixed resistor 103 and a variable resistor 104. The variable resistor 104 is used to adjust the sensitivity of the circuit by controlling current flow through the relay coil 101. One end of the coil 101 is connected to the center tap of the voltage divider 77. The other end of the coil 101 is connected through a first diode 110 to one side of the secondary 20 of the main transformer 12 and through a series combination of a resistor 111 and a second diode 112 to the other side of the secondary 20. The capacitor 102 is provided for protective purposes.

The relay coil 101 is normally not energized. However, if a ground condition should be developed anywhere in the load circuit, the coil 101 will be energized. Thus, assuming that the lower side of the secondary 20 becomes accidentally grounded, current will immediately flow from the center tap of the network 77 through the coil 101 through the diode 111 to the grounded part of the secondary 20.

The sensitivity of the relay 100 may be set at any desired value. Typically a sensitivity which causes energization at less than 1 milliampere is desirable.

The relay 100 includes a normally open switch 120 having one terminal connected to ground and a second terminal connected to the coil 61 of the relay 60. The heating element 81 of the time delay relay 80 is connected in parallel with the coil 61 and both are connected through the switch 82 to the one grounded side of the source 10 through the main power supply switch 30. Thus, as soon as the switch 120 is closed when the coil 101 is energized, the coil 61 is energized thereby opening the switch 63. When the switch 63 is opened, power from the secondary 52 of the transformer 50 is removed from the coil 35 and coil 16, with the result that power is completely removed from the main transformer 12.

The existence of a ground in the load circuit may present a potentially dangerous condition and should be remedied before power is again supplied to the load. However, it is possible that the grounded condition is temporary only. For example, a person may have inadvertently come in contact with both a power supply line and ground. For this reason, the circuit is designed to check the permanency of the grounded condition. Thus, the heating element 81 of the time delay relay 80 heats up approximately 5 seconds after current is supplied to it. At the end of 5 seconds, the switch 82 is opened, thereby deenergizing the relay 60 to once again allow current to flow from the secondary 52 to the coil 35 to cause a connection between the source 10 and the primary 11 through the switch 15. If the grounded condition has been remedied, then the coil 35 will remain energized. If, on the other hand, the grounded condition has not been remedied and the switch 120 remains closed, then the relay coil 61 will again be energized and power will be removed from the load circuit. Again, the element 81 will heat and open the switch 82 to check the grounded condition of the circuit.

It is preferable to repeat this process a number of times. Thus, the thermistor 140 is inserted in series with the circuit breaker 37, the secondary 52 and the switch 63. As the thermistor 140 heats, it decreases in resistance and thus increases the current through the circuit breaker 39, eventually opening it. The values of the thermistor 140, the circuit breaker 39, and the time delay relay 80 are such that the time delay relay 80 will open and close, for example, five times before the circuit breaker 39 opens. The circuit breaker 39 is not self-resetting and, therefore, must be reset by hand. Preferably, this will be reset only after the grounded condition has been remedied.

A lamp 160 indicates the presence of a grounded condition. Also, a normally open test switch 160, with two closed positions, is provided for testing the ground sensing circuit. By closing the test switch, first on one side and then on the other, the integrity of the ground sensing circuit can be determined. An alternative construction would be a circuit which will not turn off the power supply in the presence of a ground condition, but will merely indicate the ground by lighting the lamp.

Typical values for the circuit shown are as follows:

$T_{12}$—120 volt to 120 volt, 3 kv.-a. isolation transformer, with grounded shield
$T_{50}$—120 volt to 24 volt doorbell transformer
$Relay_{16}$—24 volt mercury (Adlake No. 1155)
$Relay_{28}$—115 volt (Potter-Bloomfield PR5AY)
$Relay_{35}$—70K ohm mercury (Adlake MWS16501-1B)
$Relay_{61}$—115 volt (Potter-Bloomfield KRP11A)
$Relay_{80}$—5 second delay relay (Amperite 115C5))
$Relay_{100}$—Same as relay 35
$C_{36}$—8 mfd., 450 volt
$C_{102}$—8 mfd., 150 volt
$C_{144}$—50 mfd., 50 volt
$R_{40}$—27K ohm (all resistors one-fourth watt unless indicated)
$R_{41}$—27K ohm
$R_{71}$—47K ohm
$R_{73}$—47K ohm
$R_{103}$—47K ohm
$R_{104}$—200K ohm adjustable
$R_{111}$—100K ohm
$R_{161}$—50K ohm All diodes—Silicon rectifiers 1 Amp., 1,000 volt.

While one embodiment of the invention has been described in detail, the invention is not limited thereto, but is defined by the following claims.

What I claim is:

1. In an ungrounded electrical power supply system, the combination comprising:
  1. circuit means for detecting the flow of current to ground in said system,
  2. switching means, having opened and closed positions, in said system for disabling said system when the switching means is in its open position and for enabling said system when switching means is in its closed position, and
  3. means coupled to said detecting means and responsive to the detection of current flow to ground, for controlling said switching means by placing said switching means in its open position for a predetermined period of time when a flow of current to ground is detected, and for placing said switching means in its closed position after the expiration of said predetermined period of time, whereby said switching means cycles between its opened and closed positions while the ground condition exists, said control means further including means for maintaining said switching means in its open position after it has opened and closed for a predetermined number of cycles.

2. The combination of claim 1 wherein said switching means includes first switching means which periodically closes and opens and second switching means which opens if ground condition remains for a predetermined period of time.

3. The combination of claim 2 wherein the rate of operation of said first switching means is such that it opens approximately 5 seconds after it closes and said second switching means opens after said first switching means has opened and closed approximately five times.

4. The combination of claim 1 further including indicator means for indicating the presence of a ground condition.

5. The combination of claim 1 further including means for creating a ground condition for test purposes.

6. An electrical distribution system including:
 1. a grounded source of electrical power,
 2. an isolation transformer and an ungrounded load circuit,
 3. means for causing power transfer from said source to the primary of said transformer only when the load of said load circuit exceeds a predetermined value,
 4. circuit means for detecting the flow of current to ground in said load circuit,
 5. switching means, having opened and closed positions, in said system for disabling the flow of current to said load circuit when the switching means is in its open position and for enabling the flow of current to said load circuit when switching means is in its closed position, and
 6. means coupled to said detecting means and responsive to the detection of current flow to ground, for controlling said switching means by placing said switching means in its open position for a predetermined period of time when a flow of current to ground is detected, and for placing said switching means in its closed position after the expiration of said predetermined period of time, whereby said switching means cycles between its opened and closed positions while the ground condition exists, said control means further including means for maintaining said switching means in its open position after it has opened and closed for a predetermined number of cycles.

7. The system of claim 6 wherein the flow of power is not reestablished if the ground condition persists for a predetermined length of time.

8. The system of claim 7 wherein said predetermined length of time is about 30 seconds.

9. The combination of claim 6 further including manual means for reestablishing the flow of power to said load.